United States Patent [19]

Hirata

[11] 4,370,740

[45] Jan. 25, 1983

[54] ROTARY RECORDING MEDIUM

[75] Inventor: Atsumi Hirata, Yamato, Japan

[73] Assignee: Victor Company of Japan, Ltd., Yokohama, Japan

[21] Appl. No.: 102,528

[22] Filed: Dec. 11, 1979

[30] Foreign Application Priority Data

Dec. 11, 1978 [JP] Japan ................................ 53-152926

[51] Int. Cl.³ ............................................. G11B 11/00
[52] U.S. Cl. ..................................... 369/276; 369/43; 369/47; 369/111; 369/279
[58] Field of Search ................. 179/100.1 G, 100.1 B, 179/100.3 V, 100.4 D, 100.3 D; 358/128.5, 128.6; 360/77, 75, 78; 250/202, 203; 369/44, 50, 47, 126, 275, 276, 279, 278, 43, 111

[56] References Cited

U.S. PATENT DOCUMENTS

| | | | |
|---|---|---|---|
| 3,931,457 | 1/1976 | Mes | 179/100.3 V |
| 4,094,010 | 6/1978 | Pepperl | 360/77 |
| 4,094,013 | 6/1978 | Hill | 369/278 |
| 4,124,868 | 11/1978 | Malissin | 179/100.4 D |
| 4,138,663 | 2/1979 | Lehureau | 179/100.4 D |
| 4,152,727 | 5/1979 | Tatsuguchi | 179/100.1 G |
| 4,170,783 | 10/1979 | Tajima | 179/100.1 B |
| 4,189,746 | 2/1980 | Valachovic | 179/100.3 V |
| 4,190,859 | 2/1980 | Kinjo | 358/128.5 |
| 4,213,148 | 7/1980 | Clemens | 179/100.4 D |

Primary Examiner—Alan Faber
Attorney, Agent, or Firm—Louis Bernat

[57] ABSTRACT

A rotary recording medium has an information signal along a spiral main track comprising a multiplicity of successively adjacent track turns of respective track turn numbers, first and second reference signals of different frequencies are recorded alternately in the radial direction of the recording medium and along reference signal tracks disposed centrally between the centerlines of mutually adjacent track turns, and a third reference signal is recorded at points where the track turn numbers change at every revolution of the recording medium. The rotary recording medium comprises, over a plurality of track turns in a specific part of the main track, displacement part for displacement of a reproducing tracing element in which displacement parts only either one of the first and second reference signals has been recorded along reference signal tracks on both sides of each of said plurality of track turns. The reproducing tracing element is displaced in the radial direction of the disc by a tracking control means operating in response to the reference signal reproduced by the reproducing tracing element upon tracing the displacement parts to quickly locate recorded information.

6 Claims, 10 Drawing Figures

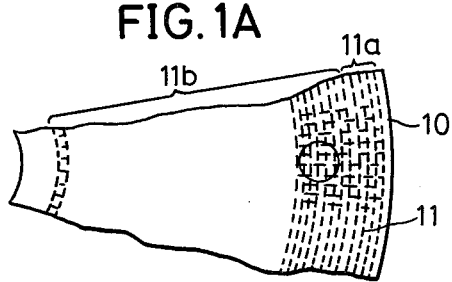
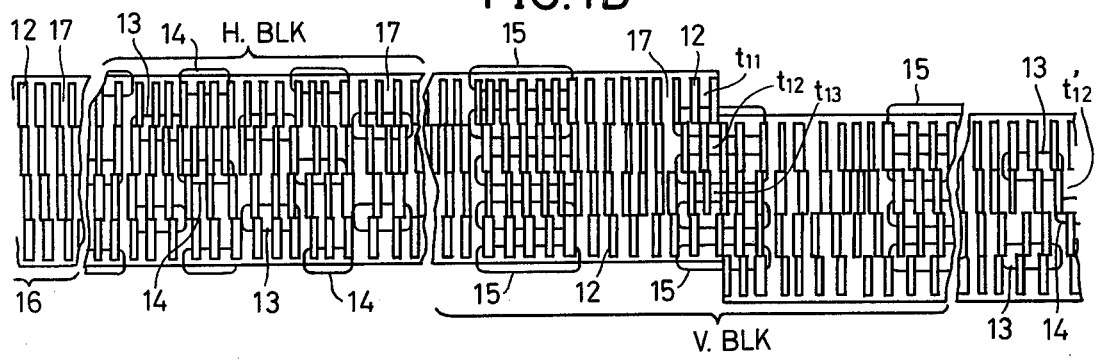
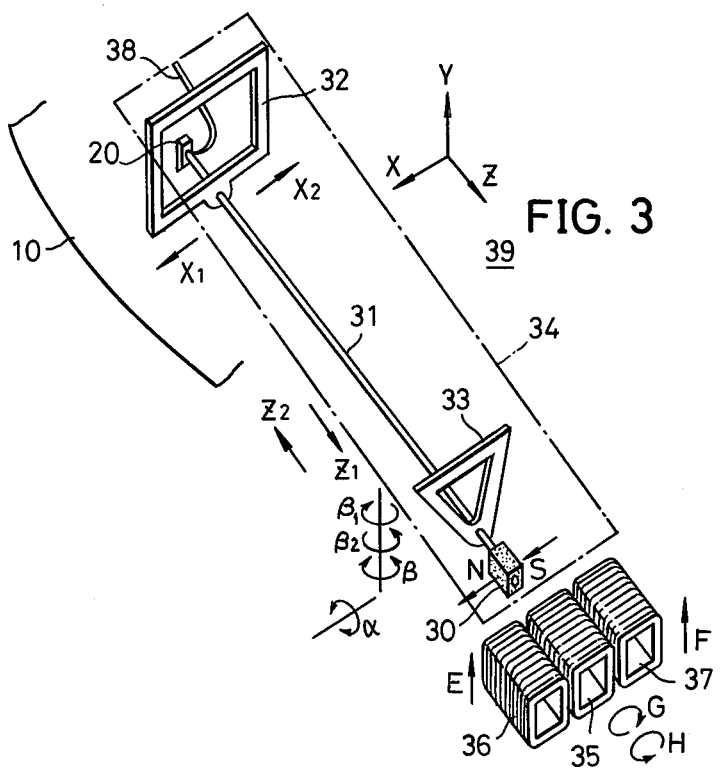

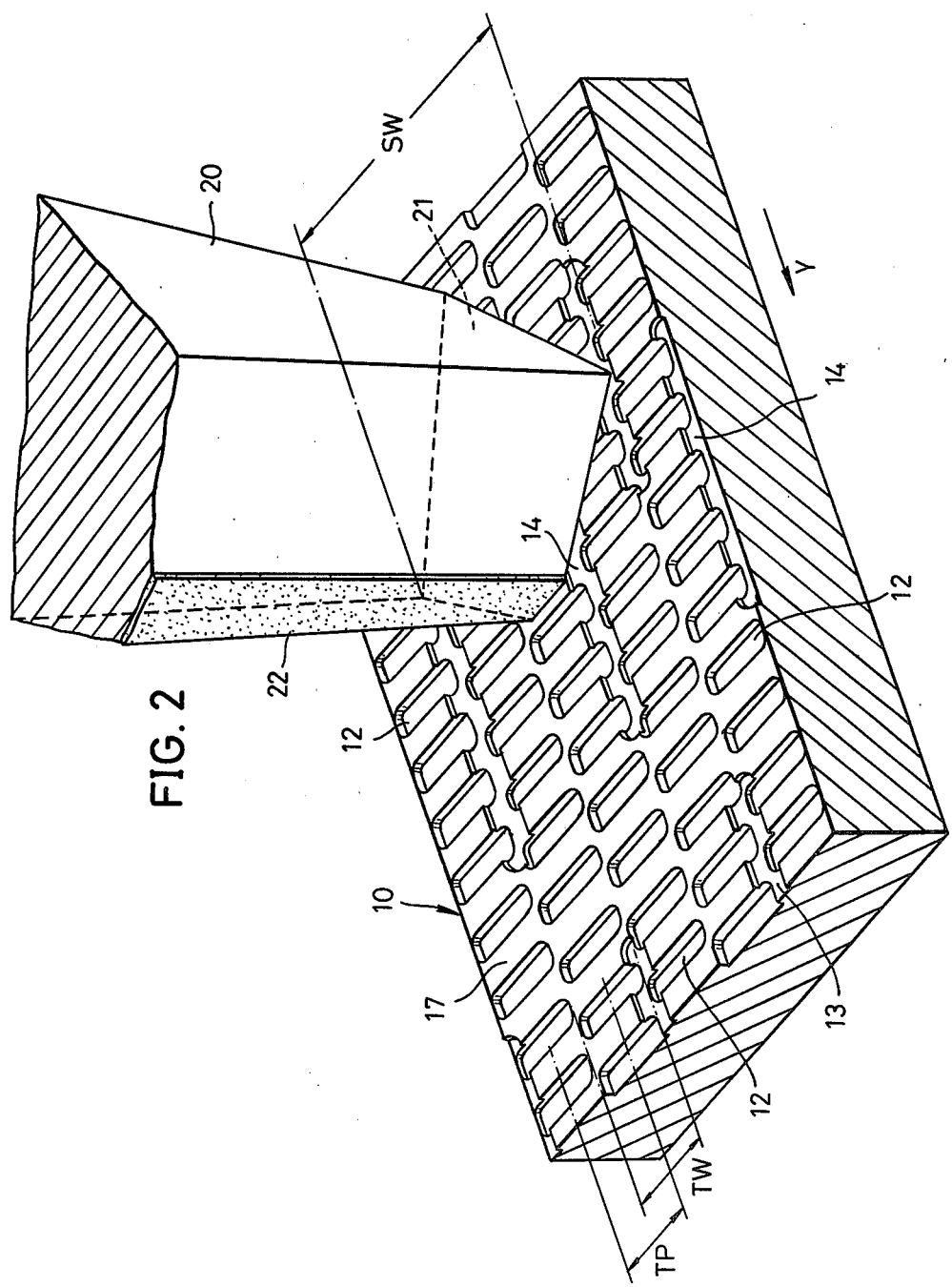

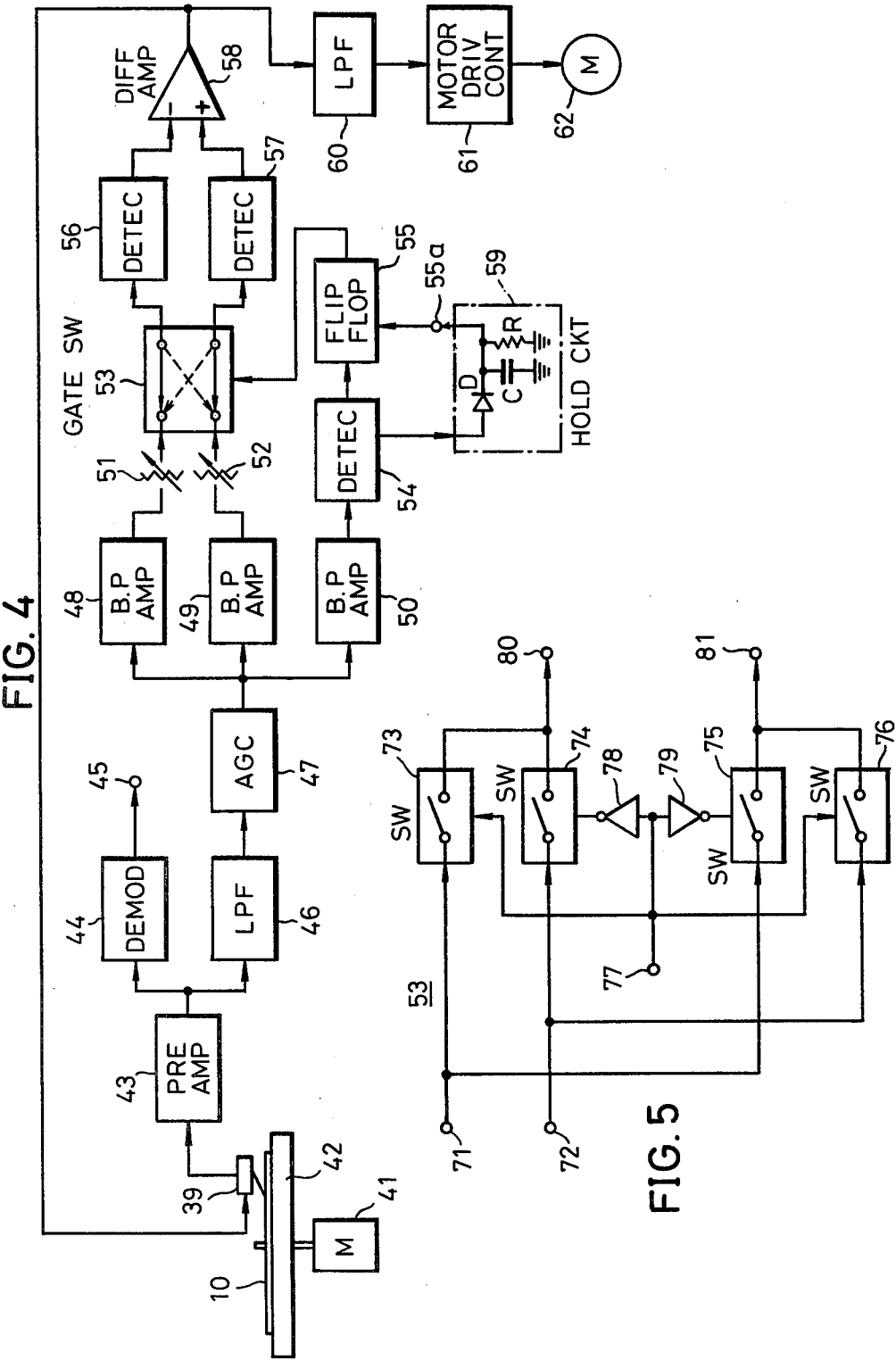

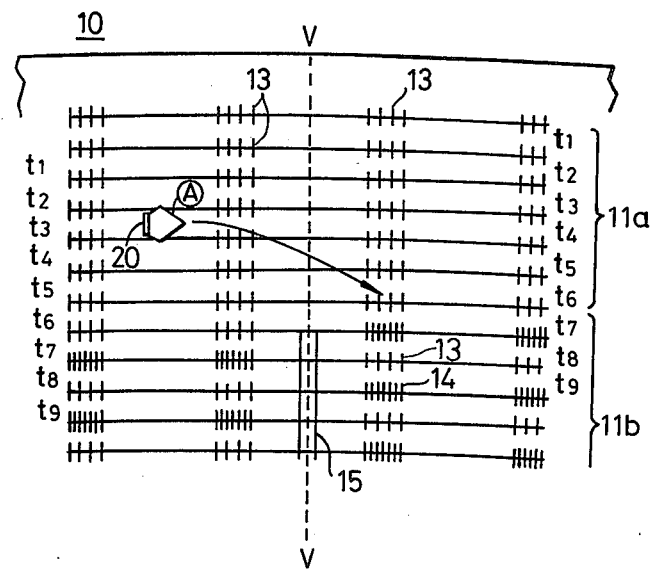
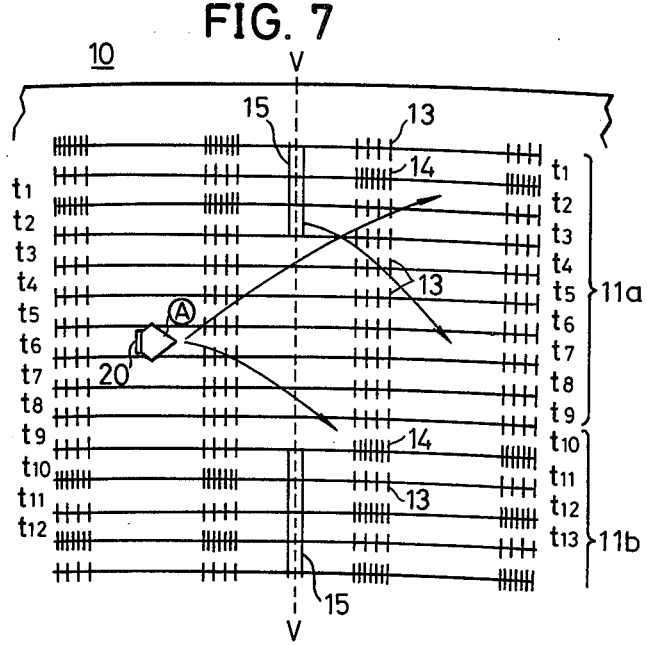

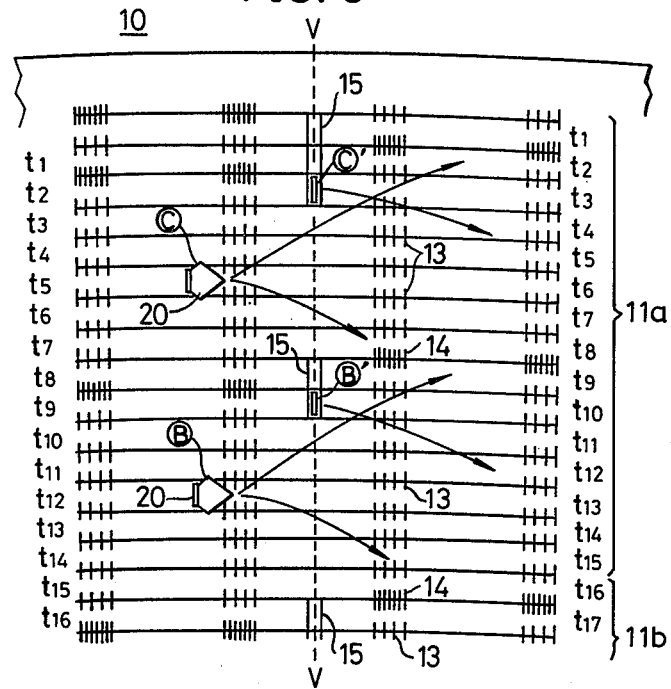
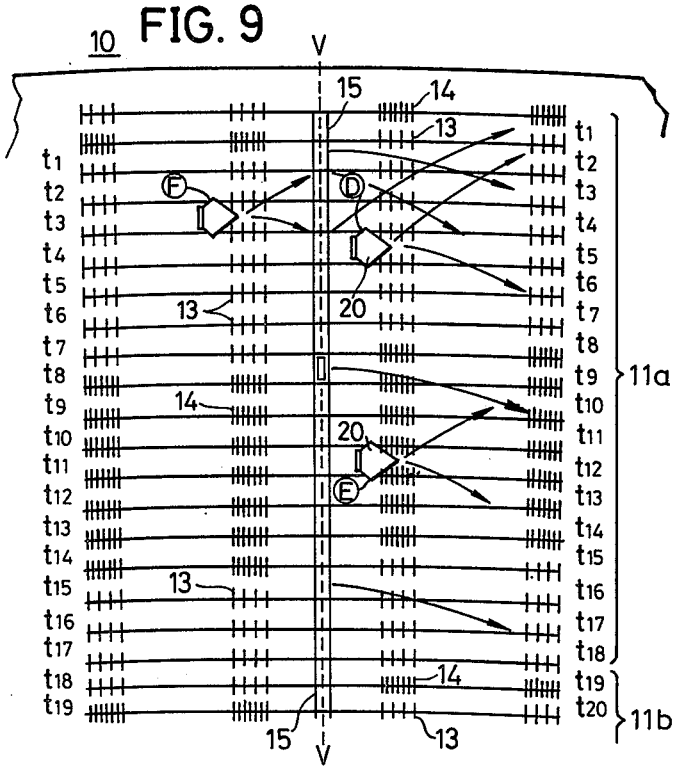

ROTARY RECORDING MEDIUM

BACKGROUND OF THE INVENTION

The present invention relates generally to rotary recording mediums. More particularly, the invention relates to a rotary recording medium of the type wherein reference signals for control of the tracking of a reproducing tracing element are recorded on opposite sides of a continuous spiral track. In the medium the reference signals are recorded in a manner such that, for example, the outer peripheral part onto which the reproducing tracing element is lowered and caused to contact can be made wide. Moreover, the reproducing tracing element can undergo displacement in a short time to the information recorded track part.

Previously, a system which records an information signal as a variation of a geometrical shape along a spiral track on a rotary recording medium, without the provision therein of a guide groove for a reproducing stylus, has been described in U.S. patent application Ser. No. 785,095, filed Apr. 6, 1977, and entitled "Information signal recording and reproducing system", and the continuation-in-part application thereof, U.S. patent application Ser. No. 33,324, filed Apr. 25, 1979, now U.S. Pat. No. 4,315,283, and entitled "Information signal recording and reproducing system".

On the recording medium (referred to as "video disc" hereinafter) are recorded an information signal such as television video signal, a first and a second pilot or reference signals for tracking control, and a third pilot or reference signal for switching the first and second reference signals at the time of reproduction. The first and second reference signals are alternately recorded at positions intermediate centerlines of adjacent information signal tracks. The third reference signal is recorded at a predetermined position on every information signal track. A reproducing system reproduces the information signal together with the third reference, and the first and second reference signals by a single reproducing element. A tracking control signal is produced from the first and second reference signals switched responsive to the third reference signal separated from the reproduced information signal. The tracking of the reproducing tracing element is controlled by this tracking control signal. The reproducing tracing element thereby traces accurately along the information signal track even without a guide groove.

In a disc of this character, the track pitch is made very small, for example, 1.4 μm, in order to obtain a high recording density. For this reason, in the recording system, a high precision is required in the feed, in the disc radial direction, of the light beam for recording the information signal on the disc. Accordingly, it is very difficult to form an unrecorded portion of large width at the so-called leading part in the vicinity of the outer periphery of the disc as in a conventional audio record disc.

Therefore, in a disc of this character, the track is formed with the normal pitch up to the outer periphery of the disc. It will be supposed that the reproduction of the information signal is to commence within 5 seconds, for example, from the instant the reproducing tracing element is lowered onto the outer periphery of the disc. For this purpose, in the case where a video signal of 4 fields is recorded for every revolution of the disc, it is necessary that the reproducing tracing element be lowered onto the outer periphery of the disc within 105 μm (calculated from $1.4 \times 15 \times 5 = 105$) since the disc is rotated at a rotational speed of 900 revolutions per minute. As a matter of mechanical precision, it is extremely difficult to lower the reproducing tracing element accurately onto the disc in this manner within the very narrow allowable range of position in the order of merely 105 μm at the start of reproduction of the disc.

On the other hand, if the allowable range for descent of the reproducing tracing element is set at a large value, the time from the lowering of the reproducing tracing element to the instant when, upon reaching the track portion where the information signal is recorded, it starts to reproduce the information signal will be long.

Thus, it is desirable that the allowable range for descent of the reproducing tracing element be large. Moreover, there is a short time interval from the instant at which the reproducing tracing element is lowered to the instant when reproduction of the information signal is started. The realization of both of these features at the same time has been desired in the art.

As one method of realizing these features, the application of the so-called random-access method known in the art appears to be possible. More specifically, the method comprises recording beforehand an address signal over the entire track inclusive of the track portion in the vicinity of the outer periphery of the disc. The reproducing apparatus reads out the difference between the address number of the track turn on which the reproducing tracing element was lowered and the address number of the initial track turn of the information signal, and quickly displaces the reproducing tracing element until the address number difference becomes zero.

By this method, however, an address signal must be recorded beforehand on the disc, and the recording system tends to become complicated. Furthermore, circuits for carrying out address detection and random access control become necessary in the reproducing apparatus, whereby the reproducing apparatus disadvantageously becomes complicated and expensive.

SUMMARY OF THE INVENTION

Accordingly, it is a general object of the present invention to provide a novel and useful rotary recording medium by which the above described desirable features are realized, and in which, moreover, the above described problems have been overcome.

Another and specific object of the invention is to provide a rotary recording medium in which, reference signals are recorded on parts thereof where an information signal is not recorded. A tracking control circuit originally possessed by the reproducing apparatus is utilized. The reproducing tracing element is lowered onto that part of the disc where the information signal is not recorded and from there it undergoes a quick displacement to the initial track turn of the information signal. A feature of the disc of the present invention is that, although there is a large range or width of the part thereof where the information signal is not recorded and onto which the reproducing tracing element is lowered, the reproducing tracing element can be moved in a very short time to the part where the necessary information signal is recorded. Furthermore, since the range of the position onto which the reproducing tracing element is lowered is large, there is no need for a high precision in selecting that position where the reproducing tracing element is to be lowered, whereby the mechanical system for lowering the reproducing tracing element can be produced at low cost.

Still another object of the invention is to provide a rotary recording medium in which the positional range wherein the reproducing tracing element is to be lowered can be made wide. Moreover, the reproducing tracing element can reach stably and positively the outermost track turn of the part where information signal is recorded.

Other objects and further features of the invention will become apparent from the following detailed description when read in conjunction with the accompanying drawings.

BRIEF DESCRIPTION OF THE DRAWINGS

In the drawings:

FIGS. 1A and 1B are respectively a fragmentary plan view of a rotary recording medium according to the present invention and a diagrammatic view showing on a large scale exemplary information signal track patterns on the rotary recording medium;

FIG. 2 is a greatly enlarged perspective view showing a reproducing stylus tracking the information signal recording medium;

FIG. 3 is an exploded perspective view of an essential part of one example of a signal pickup device for picking up signals from the rotary recording medium of the present invention;

FIG. 4 is a block diagram of one embodiment of the tracking control apparatus in an apparatus for reproducing the rotary recording medium of the present invention;

FIG. 5 is a circuit diagram showing one example of a gate switching circuit in FIG. 4; and FIGS. 6, 7, 8, and 9 are diagrammatic views respectively showing essential part of track patterns of first, second, third, and fourth embodiments of the rotary recording medium according to the present invention.

DETAILED DESCRIPTION

On the rotary recording medium (disc) 10 according to the present invention, as illustrated in FIG. 1A, a continuous spiral track 11 is formed and thereby comprises a multiplicity of successive track turns, each corresponding to one revolution of the disc 10. Along the track part 11a of the track 11 at the outer peripheral part of the disc 10, pilot signals are recorded in a track pattern described hereinafter in conjunction with FIG. 6 and succeeding figures. The information signal proper is not recorded along the main track in this outer peripheral part 11a, only a black-level video signal, for example, being recorded, and reference or pilot signals described hereinafter are recorded on opposite lateral sides of this main track. In the other track portion 11b, the information signal is recorded along the main track, and reference or pilot signals fp1 and fp2 described below are alternately recorded on opposite lateral sides of the main track.

One portion within its circular shape in this track part 11b is shown enlarged in FIG. 1B. In FIG. 1B, successive track turns of the single continuous spiral track, on the disc 10 are designated as $t_{11}, t_{12}, t_{13} \ldots$. Each track segment is constituted by the formation of pits 12 of the main information signal. With respect to one track $t_{11}$, during every horizontal scanning period H, at a position (H.BLK) corresponding to the horizontal blanking period, pits 13 of the first pilot signal fp1 are formed on one lateral side of the track as viewed in the track path direction (for example, on the right hand side in the direction of rotation). Pits 14 of the second pilot signal fp2 are formed on the other side (left hand side) of the track. With respect to the adjacent track $t_2$, the pits 14 of the second pilot signal fp2 are formed on one side (right hand side) as viewed in the track path direction at a position corresponding to the horizontal blanking period during every period H. On the other side (left hand side), the pits 13 of the first pilot signal fp1 are formed. Thus, the positions at which the pits 13 and the pits 14 of the first and second pilot signals fp1 and fp2 are formed are alternately reversed in the disc radial direction.

In addition pits 15 of the third pilot signal fp3 are formed in the position (V.BLK) corresponding to the vertical blanking period which coincides with the parts where the individual track turn designation numbers change, which takes place every rotation of the disc. Frequencies of the first, second and third pilot signals fp1, fp2, and fp3 are respectively selected to, for example, 716 KHz, 511 KHz, and 275 KHz.

In the present example of the invention, the pilot signal pits 13 and 14 are formed at only the position H.BLK within one period H. They are not formed at other parts 16, but the pits 13 and 14 may also be formed in these parts 16.

The surface 17 of those parts of the disc 10, in which pits are not formed, is planar and does not have a guide groove.

In the present embodiment of the invention, the pits 12 are formed so that one of the edge lines of each track is substantially coincident with the nearest edge line of the adjacent track. That is, the adjacent tracks $t_{11}, t_{12}, t_{13}, \ldots$ are formed so that they are successively contiguous. Accordingly, the track pitch TP is substantially equal to the track width TW. At central positions which are approximately intermediate between the centerlines of the mutually adjacent tracks, pilot signal pits 13 and 14 are formed with overlapping on two tracks adjacent each other.

FIG. 2 shows a reproducing stylus 20 tracing the recorded track on the disc 10, having the above described pit arrangement, in which only the bottom face 21 of the stylus 20 and the bottom face of an electrode 22 are shown. The bottom face 21 of the stylus has a part of maximum width SW, which is greater than the track pitch TP of the disc 10, and the electrode 22 having a thickness of 500–3000 Å is fixed to the rear face of the stylus at the rear edge of the bottom face 21. As the disc 10 rotates in the arrow direction Y, the reproducing stylus 20 traces relatively along the surface of the disc 10, the electrostatic capacitance between the electrode 22 and an electroconductive layer on the disc varies in response to the pits 12, whereby the main information signal recorded by the pits 12 is reproduced.

At the same time, the pilot signals of frequencies fp1 and fp2 recorded by the pits 13 and 14 are also reproduced by the electrode 22. In the case where the center of the electrode 22 deviates from the centerline of the track, a level difference occurs in the reproduced pilot signals, and tracking servo operation is carried out by a circuit described hereinafter.

Since the disc 10 does not have any grooves for guiding reproducing stylus as described above, probable lateral shift of the reproducing stylus 20 over one or more tracks does not cause to damage the disc 10 and the reproducing stylus 20.

Next, a description is given of an essential part of one example of a signal pickup device 39 provided with the reproducing stylus 20 for reproducing the video disc of the present invention, with reference to FIG. 3.

This pickup device 39 has a relatively long cantilever arm 31 with a reproducing stylus 20 at its distal free end and a permanent magnet member 30 at its proximal root end. This cantilever arm is supported near its free end by a damper 32 of a Rahmen or rigid frame structure (of rectangular shape). Arm 31 is held near its root part by a damper 33 having a truss structure (of triangular shape). Both of these dampers are fixed to the lower surface of a substantially horizontal support plate 34.

The cantilever arm is held at a point on the damper 32 so that it can undergo a displacement in the arrow direction X (the disc radial direction), the arrow direction Y (vertical direction), and the arrow direction Z (cantilever radial direction). Moreover, the spring constants with respect to displacements in these directions are set at desired values. Furthermore, the cantilever holding point of the damper 33 is its vertex. This point undergoes almost no displacement in the arrow directions X and Y, but it enables a translational displacement in the arrow direction Z and rotations $\alpha$ and $\beta$ respectively about the X and Y axes. At the same time, the spring constants are set as desired with respect to these displacements and rotations.

The support plate 34 is fitted in and held by a holding structure (not shown). On the lower surface of plate 34 are fixed a coil 35 for tracking and a pair of coils 36 and 37 for jitter compensation. These coils 36 and 37 are disposed on opposite sides of the tracking coil 35. The above mentioned permanent magnet member 30 is fitted within the tracking coil 35 with gaps therebetween.

The electrode of the reproducing stylus 20 is electrically connected through a metal ribbon 38 to a central conductor of the coaxial resonator (neither shown). As the reproducing stylus 20 traces along a track on the disc 10, the video signal and the reference signals recorded thereon by variation of pits is reproduced as variation in the electrostatic capacitance between the surface of the disc 10 and the electrode of the reproducing stylus 20.

The permanent magnet member 30 has a rectangular parallelepiped shape, and is magnetized so that its left side is the N pole and its right side is the S pole.

The tracking coil 35 is wound in a rectangular shape and secured such that the permanent magnet member 30 fits thereinto with a gap therebetween. The axial direction of the coil 35 coincides with the arrow Z direction. Furthermore, the jitter compensation coils 36 and 37, of rectangular cross-section, are mounted on opposite sides of and adjacent to the tracking coil 35 with their axes aligned in the arrow Z direction. The winding directions and the series connection of these jitter compensation coils 36 and 37 are such that current flows respectively through these coils 36 and 37 in the arrow directions E and F, that is, in opposite directions.

Because of the characteristics of the dampers 32 and 33, the cantilever arm 31 can be displaced in a straight line in the direction of the axis Z. At the same time, the cantilever arm 31 is supported so that it can rotate in directions $\alpha$ and $\beta$, with respect to the pivot point of the damper 33.

Next, one embodiment of the reproducing apparatus provided with the above described signal pickup device 39 will now be described with reference to FIG. 4. An operation where the reproducing stylus 20 traces the normal information signal recording track part indicated in FIG. 1B is first described.

The disc 10 rests on the turntable 42 and rotates together therewith at a rotational speed of 900 rpm., being driven by a motor 41. A reproduced signal is picked up by the reproducing stylus 20 as a minute variation of electrostatic capacitance from the disc 10. The signal is supplied to a preamplifier 43 having a resonant circuit. The resonant frequency varies in response to this variation in electrostatic capacitance and is formed into a signal of a desired level. The resulting output of the preamplifier 43 is demodulated into the original information signal by a demodulator 44 and is sent out as an output through an output terminal 45.

The output signal of the preamplifier 43 passes through a low pass filter 46 and an automatic gain control circuit 47 and is then supplied respectively to amplifiers 48, 49, and 50. Here, each of the amplifiers 48, 49, and 50 is a kind of bandpass amplifier, and is designed to have a steep passing frequency characteristic at only the frequency fp1, fp2, and fp3 respectively. The first pilot signal of frequency fp1 and the second pilot signal of frequency fp2 is obtained separately from the amplifiers 48 and 49, and respectively pass through level adjustors 51 and 52, where their levels are adjusted. The resulting signals are then supplied to a gate switching circuit 53.

The third pilot signal fp3, obtained from the amplifier 50, is supplied to a detecting circuit 54. The resulting output signal is supplied to operate a flip-flop 55. The output signal of the flip-flop 55 is applied to the gate switching circuit 53 as a switching pulse signal.

Each time an output switching pulse of the flip-flop 55 is applied thereto, the gate switching circuit 53 is switched in a manner indicated by the changing over between the contact connection state represented by full line and the contact connection state represented by broken line of the moving contacts shown schematically in FIG. 4. By this switching operation, each time a switching pulse is applied, the first pilot signal fp1 is supplied alternately to the detector circuits 56 and 57, while the second pilot signal fp2 is supplied alternately to the detector circuits 57 and 56. Accordingly, as was described with reference to FIG. 1B, the first and second pilot signals fp1 and fp2 on the left and right sides of the track exchange positions at each successive track turn on the disc 10, but the pilot signal on one side of the track (for example, the outer side as considered in the disc radial direction) is continually supplied to the detector circuit 56 with respect to all track turns, while the pilot signal on the other side of the track (the inner side) is continually supplied to the detector circuit 57.

One specific example in concrete form of the gate switching circuit 53 is shown in FIG. 5. This circuit has a terminal 71 to which the first pilot signal fp1 from the amplifier 48 is applied. The first pilot signal fp1 thus applied is supplied to analog switches 73 and 75. The second pilot signal fp2 from the amplifier 49 is applied to a terminal 72 of this circuit and thereby supplied to analog switches 74 and 76. The switching signal from the flip-flop 55 is introduced into this circuit through a terminal 77 and is applied directly to the analog switches 73 and 76 and by way of inverters 78 and 79 to the analog switches 74 and 75.

When the switching signal introduced through the terminal 77 is "1", the analog switches 73 and 76 assume their "ON" states, while the analog switches 74 and 75 assume their "OFF" states, and the first and second pilot signals fp1 and fp2 are led out respectively through terminals 80 and 81. When the switching signal is "0", the analog switches 73 and 76 assume their "OFF" states, while the analog switches 74 and 75 assume their "ON" states, and the second and first pilot signals fp2 and fp1 are led out respectively through the terminals 80 and 81. The flip-flop 55 is supplied with the output of the detector circuit 54 once every revolution of the disc 10, and its output repeatedly and alternately becomes "1" and "0". For this reason, the first and second pilot signals fp1 and fp2 are alternately led out through the terminals 80 and 81 at every revolution of the disc 10. The analog switches 73 through 76 can be consolidated in a single IC ship.

The detecting circuit 56 and 57 detect the envelopes of their respective input reference signals and convert the envelopes into DC voltages. These voltages are then supplied to the input terminals of differential amplifier 58. This differential amplifier 58 compares the output signals of the two detecting circuits 56 and 57, which outputs vary in response to the reproduced levels of the signals fp1 and fp2. This generates an output tracking error signal which indicates the tracking control direction and the error quantity. This control signal is further amplified to a specific level by known circuitry. Then, it is applied to the coil 35.

When the tracing position of the reproducing stylus 20 deviates from the proper tracing track toward the side of an adjacent track, the level of one of the reproduced pilot signals fp1 and fp2 becomes higher than the level of the other pilot signal. There is a difference between the levels of the output signals of the detection circuits 56 and 57. The differential amplifier 58 produces a tracking control current.

When the tracking control signal flows in the arrow direction G through the coil 35 of the signal pickup device 39, opposite-direction forces are generated in the cantilever arm along the axial direction. These forces act respectively on the N-pole side and the S-pole side of the magnet member 30. According to Fleming's left-hand rule, there is a reaction to the forces generated at the side wall parts of the coil 35. As a result of these two forces, there are reactions which act as a couple on the magnet member 30. As a result, a torque is produced in the $\beta_1$ direction about an imaginary vertical axis passing through the center of gravity. As a result of this torque, the cantilever 31 rotates in the $\beta_1$ direction about the point of intersection between the vertical axis and the damper 32, accompanied by a deformation of the damper 32. The reproducing stylus 20 is displaced in the arrow direction $X_2$ in FIG. 3 (i.e., across the disc in a radial direction toward the outside periphery).

Conversely, when the control signal current flows in the arrow direction H through the coil 35, a torque is produced in the $\beta_2$ direction about the above mentioned imaginary axis through the permanent magnet member 30. The cantilever arm 31 rotates in the $\beta_2$ direction about the point of this axis and juncture with the damper 32. The reproducing stylus 20 is displaced in the arrow direction $X_1$ (toward the disc center). As a result, the reproducing stylus is displaced in a direction perpendicular to the track direction in response to the magnitude and direction of the tracking control current. Thus, a tracking control is accomplished so that the reproducing stylus traces accurately and positively along the track.

A jitter component is detected from the demodulated video signal obtained through the output terminal 45, and a jitter compensation current formed in response to this jitter component is applied to the coils 36 and 37. Since this jitter compensation operation is unrelated to the present invention, a detailed description thereof will be omitted. For reference, the above mentioned tracking control operation of the signal pickup device and the jitter compensation operation are set forth in detail in U.S. Pat. No. 4,170,783, entitled "Signal pickup device of rotary recording medium reproducing apparatus".

The essential parts of the disc according to the present invention will now be described.

FIG. 6 is an enlarged schematic view of one part of the outer peripheral part 11a and the neighboring parts of a first embodiment of the disc according to the present invention. In this figure, the part between each pair of adjacent horizontal lines is a main track turn of the spiral track. Sucessive track turns corresponding to respective revolutions of the disc are designated by reference characters $t_1$, $t_2$, $t_3$, . . . . All track turns are contiguously formed in a tightly contacting manner. Pilot signal track turns are formed along the central parts, equidistant between the centerlines of adjacent main track turns, that is, along the horizontal lines constituting the lateral edges of mutually adjacent main track turns.

In the present embodiment of the invention, only the first pilot signal fp1 is recorded as pits 13 formed along all pilot signal track turns within the scope of the outer peripheral part 11a. Thus, on the two lateral sides of the track turns $t_1$ through $t_6$ within the outer peripheral part 11a, only the first pilot signal fp1 is always recorded. A video signal is recorded along the track turns $t_7$, $t_8$, $t_9$, . . . within the information signal recorded part 11b. Furthermore, as previously described in conjunction with FIG. 1B, along the lateral sides of these track turns, the first and second pilot signals fp1 and fp2 are recorded in mutually interchanged arrangement along each track turn. In addition, a third pilot signal fp3 is recorded at the position indicated by a broken line V—V where the track turn numbers change.

At the start of reproduction of this disc 10, the reproducing stylus 20 of the signal pickup device 39 is lowered onto any track turn within the outer peripheral part 11a of the disc 10. The number of track turns within the outer peripheral part 11a is selected so that the reproducing stylus 20 of the pickup device 39 can always be lowered within the outer peripheral part 11a, in consideration of the possible errors in the precision of the position of descent of the reproducing stylus.

In the case where the reproducing stylus 20 is lowered onto any track turn (for example, $t_3$) among the track turns $t_1$ through $t_6$ within the outer peripheral part 11a, as indicated by position Ⓐ in FIG. 6, only the first pilot signal fp1 is reproduced by the reproducing stylus.

In the reproducing apparatus for reproducing signals from the disc of the present embodiment of the invention, a holding circuit 59 is provided, as indicated within the enclosure of the single-dot chain line in FIG. 4 is provided. This holding circuit 59 comprises a diode D, a capacitor C, and a resistor R connected as shown. When this holding circuit 59 is supplied with a signal from the detector circuit 54, it sends an output to the clear (reset) terminal 55a of the flip-flop 55.

The third pilot signal fp3 is not recorded in the outer peripheral part 11a, and the corresponding output of the holding circuit 59 remains at zero value. For this reason, the flip-flop 55 is held in its clear state, and its output is not inverted. Therefore, the gate switching circuit 53 at this time is maintained in the connection indicated by solid lines.

The reproducing stylus 20 reproduces only the first pilot signal fp1, which is fed to the detector circuit 56. As a consequence, only the output of the detector circuit 56 is supplied to a differential amplifier 58, which thereby produces a large output control current for causing the reproducing stylus 20 to be displaced toward the center or inner part of the disc 10.

Even when the reproducing stylus 20 undergoing displacement is being transfered successively from the track turn $t_3$ to track turns $t_4$, $t_5$, ... the above mentioned control current continues to flow through the coil 35 of the signal pickup device 39 since only the first pilot signal fp1 is recorded along the pilot signal tracks. The pilot signal is recorded on opposite sides of the track turns within the scope of the outer peripheral part 11a. The reproducing stylus 20 continues its displacement toward the inner part of the disc.

After the reproducing stylus 20 reaches the track turn $t_7$ of the information signal recorded part 11b, it traces and reproduces in the normal manner the track turns $t_7$, $t_8$, $t_9$, ... in succession, one track turn for each revolution of the disc. Under the aforedescribed tracking control, the first and second pilot signals fp1 and fp2 are alternately recorded on the opposite lateral sides of each the succeeding track turns in part 11b.

In this manner, the reproducing stylus 20 is displaced quickly and inwardly to the track turn $t_7$ irrespective of the position in the outer peripheral part 11a in which it is lowered. For this reason, even when the outer peripheral part 11a is quite wide, the reproducing stylus can reach the track turns in the information signal recorded part 11b in a very short time. Thus the reproducing stylus 20 can start reproducing the information signal in a very short time after the lowering of the stylus. Furthermore, since the outer peripheral part can be made wide, strict precision of the position at which the stylus is lowered is not required.

The output signal of the differential amplifier 58 is supplied also to low-pass filter 60, where its DC component is extracted.

The output signal of the low-pass filter 60 is supplied also to a motor driving control circuit 61 and so controls the rotational driving of a motor 62, which moves the signal pickup device 39. The tracking control is carried out with the cantilever of the signal pickup device 39 constantly in the state wherein it is in its neutral position.

A second embodiment of the disc according to the invention will now be described in conjunction with FIG. 7. In the reproducing apparatus for reproducing signals from the discs of the present embodiment and other embodiments described hereinafter of the invention, the holding circuit 59 shown in FIG. 4 is not necessary. This reproducing apparatus can be any ordinary reproducing apparatus from among those proposed heretofore in great numbers for reproducing signals from discs such as that shown in FIG. 1B.

In the disc of the present embodiment of the invention, as shown in FIG. 7, first, second, and third pilot signals fp1, fp2, and fp3 are recorded in the dispositions described hereinbefore with respect to one track turn or a plurality of track turns (track turns $t_1$ and $t_2$ in the illustrated example) in the outer-most region of the outer peripheral part 11a. / With respect to the other track turns $t_3$, $t_4$, ... $t_9$, only the first pilot signal fp1 is recorded on the opposite lateral sides thereof similarly as in the preceding first embodiment of the invention.

In the case where the reproducing stylus 20 is lowered onto any track turn (for example, $t_6$) among the track turns $t_3$ through $t_9$, as indicated at position Ⓐ, within the outer peripheral part 11a, the reproducing stylus 20 reproduces only the first pilot signal fp1, which is similar to the preceding first embodiment of the invention.

Since the holding circuit 59 is not provided in the reproducing apparatus for reproducing signals from the disc of the present embodiment of the invention, the contact connection state of the gate switching circuit 53 is indeterminate. Accordingly, in the case where gate switching circuit 53 is in, for example, the state indicated by solid lines, the reproducing stylus 20 is quickly displaced toward the inner part of the disc, exactly as in the preceding first embodiment of the invention, until it reaches the track turn $t_{10}$ of the information signal recorded part 11b.

On the other hand, in the case where the gate switching circuit 53 is in the state indicated by broken lines, the reproduced first pilot signal fp1 is fed to the detector circuit 57. Only the output of the detector circuit 57 is supplied to the differential amplifier 58. As a consequence, the differential amplifier 58 produces an output control signal current with a polarity opposite to that in the above described case for causing the reproducing stylus 20 to be displaced toward the outer periphery of the disc. As a result, the reproducing stylus 20 is displaced once toward the disc outer periphery and reaches the track turn $t_2$.

Since the second and first pilot signals fp2 and fp1 are recorded on the left and right sides of the track turn $t_2$, the differential amplifier 58 produces an output a control signal current for controlling the reproducing stylus 20 so that it will trace accurately along the track turn $t_2$. Thus, the reproducing stylus 20 traces the track turn $t_2$ until, at the transition point from track turn $t_2$ to track turn $t_3$, it reproduces the third pilot signal fp3. As a consequence, the output of the flip-flop 55 is inverted. The gate switching circuit 53 is changed over from the connection indicated by broken lines to that indicated by solid lines. Then, since only the first pilot signal fp1 is recorded on both sides of the track turn $t_3$ and the succeeding track turns, the operation thereafter becomes similar to that in the above described case, and the reproducing stylus 20 is quickly displaced toward the inner part of the disc until it reaches the track turn $t_{10}$.

If the number of track turns in the track portion (i.e., the track turns $t_3$ through $t_9$) in which only the first pilot signal fp1 is recorded is selected at an excessively large number in the present embodiment of the invention, the following problem will arise. In this case, as a result of the displacement momentum of the cantilever of the signal pickup device, the reproducing stylus 20 does not stop its displacement movement immediately at the outermost track turn $t_{10}$. Upon reaching the information signal recorded part 11b of the disc, it rides over the track turn $t_{10}$, and arrives at a further inward track turn. Furthermore, depending on the conditions, the reproducing stylus 20 undergoes a further displacement from the track turn at which it has stopped after its inward displacement toward the outer periphery of the disc, thereby giving rise to hunting.

A third embodiment of the disc according to the invention in which this problem of the second embodiment of the invention has been solved will now be described with reference to FIG. 8. In the outermost region of the outer peripheral part 11a of this disc, the first, second, and third pilot signals fp1, fp2, and fp3 are recorded in their normal dispositions with respect to the track turns $t_1$ and $t_2$. With respect to the track turns $t_3$ through $t_7$ and track turns $t_{10}$ through $t_{15}$, only the first pilot signal fp1 is recorded on opposite sides thereof. With respect to the track turns $t_8$ and $t_9$ between these two track turn regions (i.e., track turns $t_3$ through $t_7$ and track turns $t_{10}$ through $t_{15}$), the first, second, and third pilot signals fp1, fp2, and fp3 are recorded in their normal dispositions.

It will be supposed that the reproducing stylus 20 has been lowered onto any track turn (for example, track turn $t_{12}$) among the track turns $t_{10}$ through $t_{15}$ as indicated at position Ⓑ. Then, in the case where the gate switching circuit 53 is in the state indicated by solid lines, for example, the reproducing stylus 20 is displaced quickly toward the inner part of the disc. This is similar to the preceding first and second embodiments of the invention, until it reaches the track turn $t_{16}$ of the information signal recorded part 11b of the disc.

In the case where the gate switching circuit 53 is in the state indicated by broken lines, the reproducing stylus 20 is quickly displaced toward the outer periphery of the disc. This is similar to the preceding second embodiment of the invention, and, upon reaching the track turn $t_9$, traces this track turn. The reproducing stylus 20 thus traces the track turn $t_9$ until it reaches the position Ⓑ' in FIG. 8, where it reproduces the third pilot signal fp3 recorded at the point of transition between the track turns $t_9$ and $t_{10}$. At this time, the gate switching circuit 53 is changed over to the state indicated by solid lines. Then, as the reproducing stylus 20 starts to trace the track turn $t_{10}$, it is quickly displaced inwardly toward the disc center since only the first pilot signal is recorded on the opposite sides of the track turn $t_{10}$.

The case where the reproducing stylus 20 is lowered onto any track turn (for example, the track turn $t_5$) among the track turns $t_3$ through $t_7$, as indicated at position Ⓒ, within the outer peripheral part 11a will now be considered. In the case where the gate switching circuit 53 is in its state indicated by solid lines, the reproducing stylus 20 is quickly displaced toward the inner part of the disc until it reaches the track turn $t_9$. The reproducing stylus 20 then traces the track turns $t_9$ and $t_{10}$ and thereafter starts to trace the track turn $t_{10}$ from the position Ⓑ', whereupon it is quickly displaced again toward the center of the disc and reaches the track turn $t_{16}$.

In the case where the gate switching circuit 53 is in the state indicated by broken lines, the reproducing stylus 20 is quickly displaced toward the outer periphery of the disc until it reaches and traces the track turn $t_2$. The reproducing stylus thus traces the track turn $t_2$, reaches the position Ⓒ', and reproduces the third pilot signal recorded at the point of transition between the track turns $t_2$ and $t_3$, whereupon the gate switching circuit 53 is changed over to its contact connection state indicated by full line. The reproducing stylus 20 thereupon commences to trace the trace turn $t_3$, but, since only the first pilot signal fp1 is recorded on both sides of the track turn $t_3$, the reproducing stylus 20 is quickly displaced toward the disc center and reaches the track turn $t_{10}$. The reproducing stylus 20 thereupon traces the track turns $t_8$ and $t_9$ in the normal manner. Then, as it starts to trace the track turn $t_{10}$ in the normal manner. Then, as it starts to trace the track turn $t_{10}$ from the position Ⓑ', it is again quickly displaced toward the disc center and reaches the track turn $t_{16}$.

In the disc of the present embodiment of the invention, a portion for track turns $t_8$ and $t_9$ where the first, second and third pilot signals are recorded in their normal dispositions is provided at an intermediate region within the scope of the outer peripheral part 11a. For this reason, the reproducing stylus 20 will not skip inwardly to the track turn $t_{16}$ under a great momentum even if a large number track turns are provided in the outer peripheral part 11a.

A fourth embodiment of the disc according to the invention will now be described in conjunction with FIG. 9. In the outermost region of the outer peripheral part 11a of this disc, the first, second, and third pilot signals fp1, fp2, and fp3 are recorded in their normal dispositions with respect to the track turn $t_1$. The outer peripheral part 11a also accommodates track turns $t_2$ through $t_7$ and track turns $t_{16}$, $t_{17}$, and $t_{18}$, with respect to which only the first pilot signal fp1 is recorded on the opposite sides thereof. With respect to the track turns $t_9$ through $t_{14}$ between these two track regions (i.e., the region of track turns $t_2$ through $t_7$ and that of track turns $t_{16}$, $t_{17}$, and $t_{18}$), only the second pilot signal fp2 is recorded on the opposite sides thereof. In addition, with respect to all track turns, the third pilot signal is recorded at positions where the track turn numbers change. For this reason, the organization of the recording system becomes simpler than for preceding embodiments of the invention.

It will be supposed that the reproducing stylus has been lowered onto a point in the vicinity of a position past the pit 15 of the third pilot signal fp3 on any track turn (for example, track turn $t_5$) among the track turns $t_2$ through $t_7$ as indicated at position Ⓓ within the outer peripheral part 11a. Then, as will be apparent from the description of the preceding embodiments of the invention, in the case where the gate switching circuit 53 is in the state indicated by solid lines, the reproducing stylus 20 is immediately displaced toward the disc center and reaches the track turn $t_8$.

On the other hand, in the case where the gate switching circuit 53 is in the state indicated by broken lines, the reproducing stylus 20 is once displaced toward the disc outer periphery and traces the track turn $t_1$. Thereafter, upon reproducing the third pilot signal fp3, it is quickly displaced toward the disc center to reach the track turn $t_8$. In this case, the time required for the reproducing stylus 20 to be displaced from the track turn $t_2$ to the track turn $t_8$ is very much less than the time required for one revolution of the disc 10 (1/15 second in the present embodiment of the invention). For this reason, there is no possibility of the reproducing stylus reproducing the third pilot signal fp3 during the above described displacement thereof. The time required for the displacement of the reproducing stylus 20 is for example, 1 m sec. or less per 10 track turns.

The track turn $t_8$ has, as a resulting effect, first and second pilot signals fp1 and fp2 recorded respectively on its left and right sides. For this reason, the reproducing stylus 20 traces along the track turn $t_8$ in the normal manner. After tracing the track turn $t_8$, the reproducing stylus 20 reproduces the third pilot signal fp3 at the transition point from the track turn $t_8$ to the track turn $t_9$. As a consequence, the gate switching circuit 53 is changed over to the state indicated by broken lines.

Then, since only the second pilot signal fp2 is recorded on the opposite sides of the track along the track turns $t_9$ through $t_{14}$, the signal pickup device receives a control signal current for causing displacement of the reproducing stylus 20 toward the disc center, whereby the reproducing stylus is quickly displaced to the track turn $t_{15}$.

Since, as a resulting effect, the track turn $t_{15}$ has the second and first pilot signals recorded on the left and right sides thereof, the reproducing stylus 20 traces along the track turn $t_{15}$ in the normal manner. As a result of the reproduction of the third pilot signal fp3 by the reproducing stylus 20 at the point of transition from the track turn $t_{15}$ to the track turn $t_{16}$, the gate switching circuit 53 is changed over to the state indicated by solid lines. Then, since only the first pilot signal fp1 is recorded on both sides of the track along the track turns $t_{16}$, $t_{17}$, and $t_{18}$, the signal pickup device receives a control signal current for causing the reproducing stylus 20 to be displaced toward the disc center. The reproducing stylus 20 is quickly displaced to the track turn $t_{19}$.

The case wherein the reproducing stylus is lowered onto a point in the vicinity of a position past the pit 15 of the third pilot signal fp3 on any track turn (for example, track turn $t_{12}$) among the track turns $t_9$ through $t_{14}$ as indicated at position Ⓔ within the outer peripheral part 11a of the disc will now be considered. In this case, also, as will be readily understandable from the foregoing description, when the gate switching circuit 53 is in the state indicated by solid lines, the reproducing stylus 20 is displaced once toward the disc outer periphery and traces the track turn $t_8$. Thereafter, the stylus 20 is again displaced toward the disc center and reaches the track turn $t_{15}$. When the gate switching circuit 53 is in the state indicated by broken lines, the reproducing stylus 20 is immediately displaced toward the disc center and reaches the track turn $t_{15}$. After tracing the track turn $t_{15}$, the reproducing stylus 20 is displaced further toward the disc center and reaches the track turn $t_{19}$, which is similar to the above described case.

It will now be supposed that the reproducing stylus 20 has been lowered onto a point in the vicinity of a position immediately in front of the pit 15 of the third pilot signal fp3 on any track turn (for example, track turn $t_3$) among the track turns $t_2$ through $t_7$ as indicated at position Ⓕ within the outer peripheral part 11a of the disc. Then, in the case where the gate switching circuit 53 is in its contact connection state indicated by full line, the reproducing stylus 20 is immediately displaced toward the disc center. Before it can reach the track turn $t_8$, it reproduces the third pilot signal fp3. At this time, the gate switching circuit 53 is changed over to the state indicated by broken lines, whereby the stylus 20 is displaced toward the disc outer periphery and reaches the track turn $t_1$. However, after tracing the track turn $t_1$, the stylus 20 is displaced toward the disc center and thereafter finally reaches the track turn $t_{19}$, which is similar to the above described case.

On the other hand, in the case where the gate switching circuit 53 is in its state indicated by broken lines, the stylus 20 is displaced toward the disc outer periphery. Upon reproducing the third pilot signal fp3, the stylus is displaced toward the disc center. Thereafter, the stylus 20 finally reaches the track turn $t_{19}$, which is similar to the above described case.

The operation in the case where the stylus 20 has been lowered onto a point in the vicinity of a position immediately in front of the pit 15 of the third pilot signal fp3 on any track turn among the track turns $t_9$ through $t_{14}$ within the outer peripheral part 11a of the disc can also be readily understood from the foregoing description, and, therefore, its description will be omitted.

It is imperative that the reproducing stylus 20 carry out accurate and positive tracing of the outermost track turn of the information signal recorded part 11b of the disc without skipping over this track turn. In order to realize this tracing operation, it is desirable to provide alternate track regions wherein only the first pilot signal fp1 is recorded on both sides of the track and track regions wherein only the second pilot signal fp2 is recorded on both sides of the track. Moreover, it is desirable to provide, within the track regions, track turns of respective numbers which successively diminish respectively from the outer periphery toward the center such as, for example, 50, 40, 20, 10, and 5 track turns.

While, in the above described embodiments of the invention, the positions where the reproducing stylus 20 is lowered are described as being in the outer peripheral part of the disc, these positions are not so limited and may be between specific signal programs recorded on the disc.

Further, this invention is not limited to these embodiments but variations and modifications may be made without departing from the scope of the invention.

What is claimed is:

1. A grooveless rotary recording medium, at least one surface of which has a spiral main track comprising a multiplicity of successively adjacent track turns, each of said turns being identified by a respective track turn number, and a reference signal track disposed centrally between the center lines of mutually adjacent track turns of the main track, said surface comprising:
    at least one displacement part comprising a plurality of track turns of the main track having no information signal recorded thereon, only either one of first and second reference signals being recorded in reference signal tracks along both of the opposite sides of each main track; and
    at least one information part comprising track turns of the main track having an information signal recorded thereon, the first and second reference signals being recorded alternately in the reference signal tracks on opposite sides of the main track, and a third reference signal being recorded at positions where the track turn numbers change at every revolution of the recording medium.

2. A rotary recording medium as claimed in claim 1, in which the displacement part is formed in an outer peripheral part of the recording medium which is farther out than the information part.

3. A rotary recording medium as claimed in claim 1, in which said one displacement part further comprises outermost track turns of the main track having no information signal recorded thereon, the first and second reference signals being recorded alternately in the radial direction of the recording medium and on the reference signal track corresponding to the outermost track turns of the main track, and the third reference signal being recorded at positions where the track turn numbers in the outermost track turns change at every revolution of the recording medium.

4. A grooveless rotary recording medium at least one surface of which has a spiral main track comprising a multiplicity of successively adjacent track turns, each of said turns being identified by a respective track turn number, and a reference signal track disposed centrally between the center lines of mutually adjacent track turns of the main track, said surface comprising:
- at least one displacement part comprising a plurality of track turns of the main track having no information signal recorded thereon, either one of first and second reference signals being recorded in reference signal tracks along both of the opposite sides of each main track; and
- at least one information part comprising track turns of the main track having an information signal recorded thereon, the first and second reference signals being recorded alternately in the reference signal tracks on opposite sides of the main track, and a third reference signal being recorded at positions where the track turn numbers change at every revolution of the recording medium, said one displacement part comprising
- a plurality of subdivisions, each of which comprises: outermost track turns of the main track on each subdivision having no information signal recorded thereon, wherein the first and second reference signals are recorded alternately in the radial direction of the recording medium on the reference signal track corresponding to the outermost track turns of the main track, and the third reference signal is recorded at positions where the track turn numbers in the outermost track turns change at every revolution of the recording medium; and a plurality of track turns of the main track subsequent to the outermost track turns having no information signal recorded thereon, wherein only either one of the first and second reference signals is recorded along the reference signal track on opposite sides of each of the plurality of track turns of the main track.

5. A rotary recording medium, at least one surface of which has a spiral main track comprising a multiplicity of successively adjacent track turns each identified by a respective track turn number, and a reference signal track disposed centrally between the center lines of mutually adjacent track turns of the main track, wherein a third reference signal is recorded at positions where the track turn numbers change at every revolution of the recording medium; said surface comprising:
- at least one displacement part including at least one first subdivision comprising at least one track turn of the main track having no information signal recorded thereon, first and second reference signals recorded respectively along the reference signal track and on both sides of said at least one track turn, and track turns of the main track having no information signal recorded thereon which are subsequent to said at least one track turn, both sides of each of said track turns in the first subdivision only either one of the first and second reference signals being recorded along the reference signal track, and at least one second subdivision comprising at least one track turn of the main track having no information signal recorded thereon, first and second reference signals being recorded respectively along the reference signal track on both sides of said at least one track turn in the second subdivision, and subsequent track turns of the main track having no information signal recorded thereon, only the other of the first and second reference signals being recorded along the reference signal track on both sides of each of said subsequent track turns in the second subdivsion; and
- at least one information part comprising track turns of the main track having an information signal recorded thereon, the first and second reference signals being recorded alternately in the radial direction of the recording medium on the reference signal track.

6. A rotary recording medium as claimed in claim 5, in which the total number of the first and second subdivisions is more than two, and the first and second subdivisions are disposed alternately in said one displacement part, the number of track turns of the main track in each of the first and second subdivisions being gradually smaller as their positions are nearer to the information part.

* * * * *